United States Patent [19]

Gaenge et al.

[11] 4,128,926

[45] Dec. 12, 1978

[54] METHOD FOR THE PRODUCTION OF AN ELECTRIC STACK CAPACITOR OF METALLIZED SYNTHETIC MATERIAL FILMS

[75] Inventors: Friedrich J. Gaenge; Ferdinand Utner; Harald Vetter; Gerhart Vilsmeier, all of Regensburg, Germany

[73] Assignee: Siemens Aktiengesellschaft, Berlin & Munich, Germany

[21] Appl. No.: 815,217

[22] Filed: Jul. 13, 1977

[30] Foreign Application Priority Data

Jul. 30, 1976 [DE] Fed. Rep. of Germany ....... 2634442

[51] Int. Cl.² .................................................. H01G 4/30
[52] U.S. Cl. .................................... 29/25.42; 242/56.1
[58] Field of Search ...................... 29/25.42; 242/56.1; 361/309

[56] References Cited

U.S. PATENT DOCUMENTS

| 2,882,586 | 4/1959 | Shen | 29/25.42 |
| 3,670,378 | 6/1972 | Behn et al. | 29/25.42 |

FOREIGN PATENT DOCUMENTS 994173  6/1965  United Kingdom.

*Primary Examiner*—Carl E. Hall
*Attorney, Agent, or Firm*—Hill, Gross, Simpson, Van Santen, Steadman, Chiara & Simpson

[57] ABSTRACT

A method and apparatus is disclosed for the production of an electric stack or layer capacitor of metallized synthetic material films. The capacitor is produced by bending or folding a film by means of a set of folding wheels which are spaced double the folding width at the film inflow and are spaced as close as possible to one another at the film outflow. The invention is advantageously utilized for the production of layer capacitors.

7 Claims, 5 Drawing Figures

Fig. 2
Fig. 2A
Fig. 3
Fig. 4
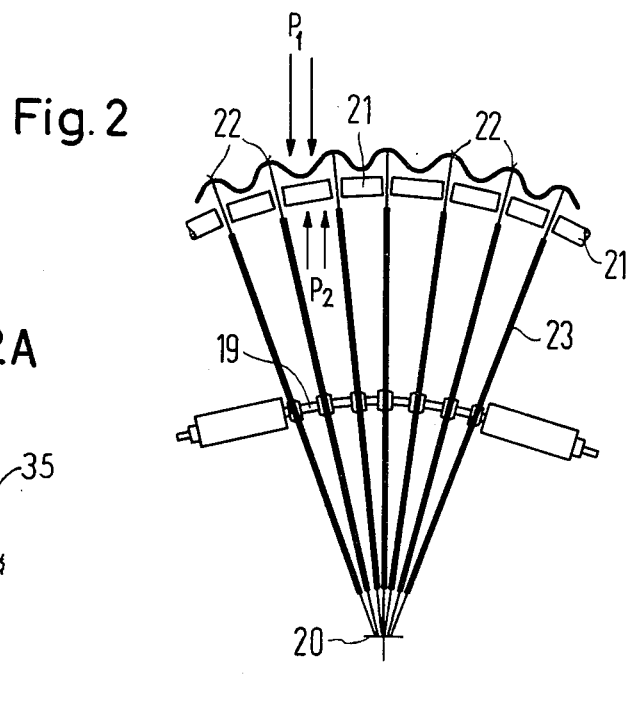
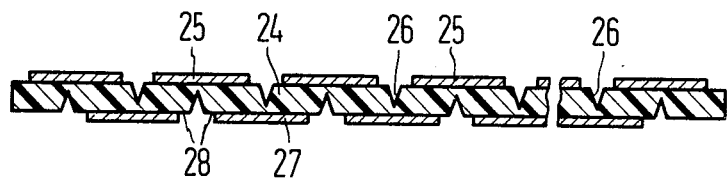
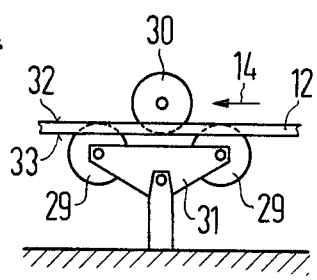

METHOD FOR THE PRODUCTION OF AN ELECTRIC STACK CAPACITOR OF METALLIZED SYNTHETIC MATERIAL FILMS

BACKGROUND OF THE INVENTION

1. Field of the Invention

The present invention relates to a method for the production of an electric stack or layer capacitor of metallized synthetic material films in which at least one synthetic material film coated with a metal and having a width which is a multiple of the width of the capacitor to be produced is continuously folded in its longitudinal direction into a stack of layers superimposed one upon the other. Each metal coating which can be reached at the superimposed folding edges is frontal-contacted by a metal layer. The capacitor block thus formed is cut into individual capacitors.

2. Description of the Prior Art

Such a method is known from U.S. Pat. No. 2882 586, wherein it has been suggested for creation of a continuous longitudinal fold to pull a synthetic material band metallized on both sides, for example, between two sets of vertical rollers pressing from both sides against the band and thereby folding the band. Each fold is built by several rollers. Precise guiding and smooth folding of thin foils therefore is not obtained. Between two of said several rollers crossfolds can occur which become hardened by the roller and can damage very thin synthetic material bands. In accordance with British letters patent No. 994,173, a synthetic material band having a width which is a multiple of the width of the synthetic material film required in the individual capacitor is coated on both sides with metal strips, respectively, corresponding with the width of the metallization in a capacitor, and which are separated from one another by means of metal-free insulating strips. This capacitor band is folded crosswise to its longitudinal extension; the folding edges are frontal-contacted in the area of the metallizations so that a capacitor block is formed; and this capacitor block is sawed into individual capacitors in the area of the metal-free strips. This method facilitates the production of capacitor blocks whose length is as large as the width of the capacitor band used. Each capacitor block has to be schooped separately, i.e. it has to be coated and thereby thus frontal-contacted in accordance with Schoop's metallization after the folding process, and it has to be provided with connection elements and separated. Thus, this method is discontinuous and a continuous production of a fold block of random length is not possible.

SUMMARY OF THE INVENTION

An object of the present invention is to economically produce stack or layer capacitors, while protecting the films of the capacitor.

This object is achieved by conveying a synthetic material band or film to a set of folding wheels at inlet points tangential to the periphery of the wheels. The band is deflected and bent while being supported at the periphery of these folding wheels. The axes of the folding wheels are inclined towards one another in such a manner that the folding wheels at the film inlet points are apart by approximately the amount of double the folding height, and at film outflow points the wheels are only slightly separated from one another. The synthetic material band is stretched by tension in its running direction, and accordingly the band guides itself and is simultaneously stretched between the folding wheels and is thus folded. The folded band is then hardened by pressure and/or heat into a fold block which is frontally contacted and separated into individual capacitors. The synthetic material band is thus stretched across its width and is additionally stretched across the individual folding wheels so that the film area supported by the folding wheels is considerably stretched and thus guides itself due to the high frictional forces.

A fold block can continuously be produced by this method. This method is particularly effective if the fold block is contacted directly after its production (for example by Schoop layers) and is separated into capacitors. Thus, the capacitor production can be accomplished completely automatically. However, the fold block can also first be wound onto a large wheel and further processed in known manner for layer capacitors using metallized synthetic material films of stretchable synthetic material. It is particularly recommended to completely schoop the capacitor block formed on the wheel on its frontal sides, and to sever the individual capacitors by sawing cuts in such a manner that the edges of the synthetic material films are stretched by the heat of the sawing and are thus insulated. This results with the use of valve metals, particularly aluminum as a coating material, since the metal coating is broken up in the area of the saw edges into islands insulated from one another.

Moreover, the method of this invention has the advantage that the folding process is practically unlimited in velocity. Consequently, the folding velocity is only determined by the subsequent work processes. As the folding wheels do not move the synthetic material band to be folded during the folding process, the synthetic material band is little stressed mechanically. No frictional forces occur. Thus, very sensitive and thin films can be processed by this method. The stretching of the synthetic material band in the area of its edges is also relatively small. The optimal stretch and friction conditions can be determined by: an adjustable film tension setting; the selection of the thickness of the discs of disc-shaped folding wheels (so-called folding discs) in the folding area; the folding disc outside diameter with respect to the desired fold number; and the width of the synthetic material band. The folding wheels, however, do not have to be structured as folding discs. It is sufficient when they are thin in the region of their periphery.

Cross folds formed during the folding process by the longitudinal differences of the exterior- and interior-fold, or by the fold movement crosswise to the vertical axis, do not have any influence on the folding process as they disappear in view of the film tension in the proximity of the film outflow point.

A particularly precise guiding of the synthetic material band is obtained if the synthetic material band is mechanically weakened at the preset fold points.

A hardening of the fold block is advantageously obtained if the fold block is heated by means of a field of high frequency, and is simultaneously exposed to pressure. In order to obtain a fold block of greater height it is recommended that several fold blocks be superimposed before the hardening, and are subsequently hardened into one fold block.

Particularly precise guiding and smooth folding is obtained when the synthetic material band is pressed against the folding wheels by means of an air pressure drop between the outer and inner sides of the band. This is particularly advantageous with relatively thick synthetic material bands.

It is particularly advantageous for thin synthetic material bands if two or more synthetic material bands are superimposed in their running direction before they reach the folding wheels, are jointly folded by the folding discs, and are again separated at the film outflow. The fold blocks thus obtained can then be separately processed by themselves. They can also be superimposed by corresponding deflection rollers, and again be hardened into a joint fold block.

The method of this invention is advantageously carried out with a device in which a set of folding wheels is arranged after the deflection rollers in a running direction of the film. The axes of the folding wheels are arranged to lie in one plane and are inclined towards one another. The spacing in relation to one another approximately corresponds at the film inlet points with twice the width of the fold block to be produced, i.e. at the points at which the film touches the folding wheels for the first time, and where the distance of the folding wheels is the smallest possible at the outflow points of the film (at the points at which the film just barely touches the folding wheels). A pair of contact pressure rollers are arranged adjacent the outflow points in the running direction of the band. The rollers press the folds together approximately as they exit from the outflow points. For folds of the same depth it is preferable if the centers of the folding wheels lie on a trochoid curve, and if the film outflow points form a straight line. With this arrangement a broad drawing effect is attained at the inlet of the film which, under certain conditions, makes the use of a broad drawing roller superfluous. This arrangement also produces a fold block without displacing the folding edges in relation to one another. If a mutual displacement of adjoining folding edges is to be obtained, it is recommended to select the diameter of adjoining folding wheels differently. The spacing of the folding wheels in the region of the film inlet position effects the folding of edges formed between the folding wheels.

In order to obtain folds which are as tight as possible, it is preferable that the folding wheels be structured as folding discs which taper in a radial direction towards the periphery. This can be obtained by a corresponding tapering radial cross-section of the disc, or also the disc may be thinly structured and reinforced in sandwich fashion near the axes.

The folding wheels can also be dimensioned in such a manner that a straight line results not only at the film inflow but also at the film outflow. Folding wheels with different diameters are used to accomplish this. The wheels correspondingly turn with different angle velocities. The centers of the folding wheels can also lie on a circular curve. In that case a certain displacement of adjoining folding edges in relation to one another results as long as folding wheels of the same diameter are used.

The alignment of the folding discs at the film inflow points as well as at the film outflow points is particularly critical. It is therefore recommended to align the folding discs in the area of the film inflow and the film outflow by means of guide elements. It is furthermore recommended for the exact fixing of the position of the folding edges that rotatable or fixed guide discs are arranged between the fold outflow points and the contact pressure rollers. These guide discs grip into the respective folds of the synthetic material band from both sides and thus fix the folds in position. If the coatings situated in the interior are to be destroyed in the area of the folds in order to form coating-free strips, it is recommended that the guide discs be connected to a voltage with respect to the metallizations on the synthetic material film, the voltage being sufficient to burn off portions of the metallization.

A fold block produced with the device of this invention can also be further processed into a wound capacitor. In that case, preferably a lateral displacement of adjoining windings in relation to one another is not employed.

BRIEF DESCRIPTION OF THE DRAWINGS

FIG. 2 illustrates a set of folding wheels in the running direction of the film used in the formation of the stack capacitors;

FIG. 2A is an alternate embodiment of folding discs shown in FIG. 2;

FIG. 3 shows a cross-sectional view of a capacitor film with notches at preset folding points; and FIG. 4 schematically illustrates a side view of a set of guide discs.

DESCRIPTION OF THE PREFERRED EMBODIMENTS

Figure 1:
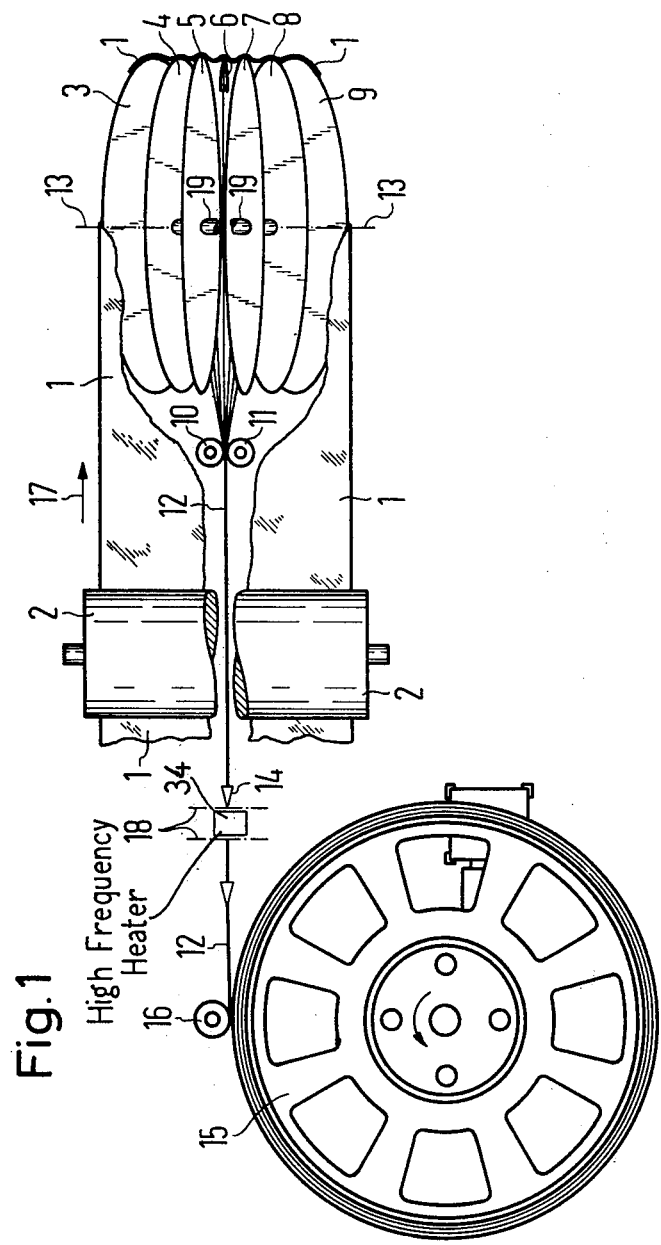
FIG. 1 schematically illustrates a top breakaway view of a device of this invention for forming stack capacitors according to a method of this invention.

A synthetic material band 1 vapor deposited on both sides is deflected in the direction of the arrow 17 by means of a deflection roller 2 so that the band tangentially touches the periphery of folding discs 3 through 9 at inflow points which lie across the axis 13 of the folding discs 3 through 9. The discs may be thin and have additional supporting discs extending from the central axes or they may be tapered as shown at 35 in FIG. 2A. The synthetic material band 1 is continuously folded by means of the folding discs 3 through 9 such that the synthetic material band 1 with respect to the folding discs 3 through 9 does not move in the region of mutual contact. A high air pressure $P_1$ above the band may be utilized to press the band against the wheels while maintaining a pressure $P_2$ below the band at a value less than $P_1$. Underneath the folding disc 6 as shown in the breakaway illustration of FIG. 1, the synthetic material band 1 has been folded. It is hardened into a fold block 12 by the contact pressure rollers 10 and 11. The fold block 12 runs in the direction of the arrow 14 to a high frequency heater 34, if desired, and, after additional process steps such as an additional hardening in the area of the interval 18, to a wheel 15 having a large exterior diameter onto which the fold block 12 is wound and pressed by a pressure roller 16. Several windings of the fold block 12 form a master capacitor on this wheel. This master capacitor is then continuously metallized on its frontal sides (in accordance with the Schoop metallization, for example) and is subsequently separated into individual capacitors. In this case, the production of the master capacitors can proceed in the manner normal for layer capacitors and known, for example, from U.S. Pat. No. 3,670,378.

In the interval 18, on the other hand, the fold block 12 can also directly be contacted frontally and sawed into individual capacitors if the capacitance obtainable by a fold block already corresponds with the requirements. In that case the winding onto the wheel 15 is not employed.

The fold block 12, can, in the case of a relatively small number of foldings, be also wound onto a winding mandrel as a rolltype capacitor and further treated in the manner normal for wound capacitors. Thus, the device of this invention is also suited to economical production of wound capacitors. Such a capacitor could then be wound without lateral displacement of the adjoining windings of the fold block, since all exterior-lying metallizations are to be contacted.

The depth of the folds producible is practically unlimited and only depends on the geometry of the folding wheels.

In FIG. 2, folding wheels 23 are arranged on a trochoidshaped axis 19. The film inflow points 22 also lie on a trochoid curve while the film outflow points lie on a straight line 20. If a displacement of adjoining folding edges is to be obtained, it is advantageous to have the second of each of the folding wheels 23 exhibit a somewhat smaller diameter. In order to set the position of the folding edges which are formed between the folding wheels, the distances of the folding wheels can be selected differently at the film inflow points.

The axis 19 in the present case can be curved and can rotate, or can be a curved and fixed axis. In the latter case, each folding wheel 3 through 9 is supported individually. If the folding wheels exhibit different diameters, the individual bearing is to be preferred. Although, a different type of bearing is also possible.

The spacings of the folding wheels 23 in relation to one another in the area of the film inflow points 22 are determinative of the folding height. These spacings are therefore fixed by means of the guide elements 21 which are arranged in the area of the film inflow points 22. These guide elements can operate on a mechanical, pneumatic, or magnetic basis. Corresponding guide elements which are not illustrated, can, if necessary, also be arranged in the area of the film outflow points.

Sets of rotatable or fixed guide discs 29, 30 (FIG. 4) are arranged, if necessary, in the running direction 14 of the folded synthetic material band 1 in front of the pressure rollers 10, 11. These guide discs 29, 30 grip into the individual folds from below or from above, align the folding edges 32, 33, and guide them to the pressure rollers 10, 11 in the desired position vis-a-vis adjoining folding edges 32, 33. Two rows of guide discs 29 are supported in swivel-like fashion via at least one bearing block 31. The guide discs 30 are arranged in the film running direction 14 between the two rows of guide discs 29. One or two respective guide discs 29 grip into one and the same fold opening downwardly, whereas the guide discs 30 grip into the folds opening upwardly.

In FIG. 3 the capacitor film 24 exhibits coatings 25 and 27 displaced in relation to one another, and are respectively separated from one another by metal-free strips 28. In the area of the metal-free strips 28, indentations 26 are located which weaken the dielectric and thus form preset folding points. Such indentations are expediently produced by scratching, i.e. chip removing or simply by impressing. Correspondingly formed wheels which are pressed against the film and preferably abutting a deflection roller are suited for impressing.

The film 24 can, depending on its thickness, be folded in such a manner that the indentations 26 lie inside or outside. If the indentations 26 lie inside, the metallization 25 or 27 can directly be reached by a frontal contact layer. If the indentations 26 lie on the outside, the frontal contacting provides as a metal sprayed on in accordance with the Schoop metallization must penetrate the dielectric layer and contact the layer lying underneath.

Two unipolar coatings always come to lie one atop the other by means of the folding of the capacitor band 24 so that a congruent course of the coating edges is not required.

Piercing holes can be mounted in the area of the indentations 26 for better contacting. These appear as recesses after the folding and can facilitate the penetration of the Schoop material to the interior metal coating.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method for the production of an electric stack capacitor having synthetic material film with metal coatings forming a stack of superimposed folded layers, the metal coatings being frontal-contacted by a metal layer, comprising the steps of:
   (a) providing a synthetic material band having a metal coating and a width which is a multiple of a width of the capacitor to be produced;
   (b) providing a set of folding wheels, the axes of the folding wheels being inclined towards one another in such manner that at a band inflow position the wheels are spaced approximately double the amount of a desired folded width from each other and at an outflow position are spaced a slight distance from one another relative to the spacing at the inflow position;
   (c) conveying said band to the inflow position of the folding wheels, said band being tangent to the wheels, stretched, and folded by the wheels to create continuous longitudinal folds, said band exiting from the wheels at the outflow position;
   (d) hardening the folded band as it is conveyed from the outflow position to form a fold block;
   (e) frontal contacting the metal coatings; and
   (f) separating the fold block into individual capacitors.

2. A method according to claim 1 in which said step of hardening is accomplished by heating.

3. A method in accordance with claim 1, characterized in that the synthetic material band is mechanically weakened at preset folding points.

4. A method in accordance with claim 1, characterized in that the fold block is heated by means of a field of high frequency and is simultaneously exposed to pressure and thus hardened.

5. A method in accordance with claim 1, characterized in that several fold blocks are layered one atop the other before the hardening, and are then jointly hardened into one fold block.

6. A method in accordance with claim 1, characterized in that the synthetic material band is pressed against the folding wheels by means of an air pressure drop between an exterior and an interior side.

7. A method in accordance with claim 1, characterized in that at least two synthetic material bands are superimposed in their running direction before the inflow of the folding wheels and are jointly bent by the folding wheels and are guided apart again at the film outflow.

* * * * *